United States Patent
George et al.

(10) Patent No.: US 10,592,538 B2
(45) Date of Patent: Mar. 17, 2020

(54) UNSTRUCTURED DOCUMENT MIGRATOR

(71) Applicant: INTERNATIONAL BUSINESS MACHINES CORPORATION, Armonk, NY (US)

(72) Inventors: Palliyathu Vishal George, Babusapalya (IN); Michael J. Iantosca, Wake Forest, NC (US); John Kurian, Bangalore (IN); Balaji Sankar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 15/862,022

(22) Filed: Jan. 4, 2018

(65) Prior Publication Data
US 2019/0205460 A1   Jul. 4, 2019

(51) Int. Cl.
| G06F 16/31 | (2019.01) |
| G06F 17/21 | (2006.01) |
| G06F 17/27 | (2006.01) |
| G06F 16/93 | (2019.01) |

(52) U.S. Cl.
CPC ........... G06F 16/313 (2019.01); G06F 16/93 (2019.01); G06F 17/21 (2013.01); G06F 17/2765 (2013.01)

(58) Field of Classification Search
CPC ...... G06F 17/21; G06F 17/27; G06F 17/2765; G06F 16/185; G06F 16/20; G06F 16/214; G06F 16/22; G06F 16/93; G06F 16/119; G06F 9/5083; G06F 3/0647
See application file for complete search history.

(56) References Cited

U.S. PATENT DOCUMENTS

| 5,878,386 | A  | * | 3/1999  | Coughlin ........... G06F 17/2705 704/10 |
| 8,127,225 | B2 |   | 2/2012  | Petri |
| 9,256,582 | B2 |   | 2/2016  | Caten |
| 2009/0157714 | A1 | * | 6/2009 | Stanton .................. G06F 17/21 |
| 2009/0210861 | A1 |   | 8/2009 | Alupului |
| 2009/0265160 | A1 | * | 10/2009 | Williams ........... G06F 17/2211 704/9 |
| 2009/0271711 | A1 |   | 10/2009 | Hartshorn et al. |
| 2014/0115442 | A1 | * | 4/2014 | Caten .................. G06F 17/2247 715/234 |

(Continued)

OTHER PUBLICATIONS

Peter Mell et al, The NIST Definition of Cloud Computing, National Institute of Standards and Technology, Publication 800-145, 2011, entire document.

(Continued)

*Primary Examiner* — Paras D Shah
(74) *Attorney, Agent, or Firm* — Patrick J. Dougherty; Daugherty & Del Zoppo Co., LPA

(57) ABSTRACT

Aspects migrate an unstructured document to a specific document type definition Darwin Information Typing architecture wherein processors are configured to calculate a verb to noun ratio of an unstructured document by dividing a of plurality verbs of the unstructured document by a plurality of nouns of the unstructured document, assign a first weight to the unstructured document based on the calculated verb to noun ratio, and migrate the unstructured document to a specific document type definition Darwin Information Typing Architecture based on the first weight.

20 Claims, 8 Drawing Sheets

(56) References Cited

U.S. PATENT DOCUMENTS

2014/0195896 A1    7/2014  Caten
2017/0091207 A1*  3/2017  Kumar ................ G06F 16/2228
2019/0108205 A1*  4/2019  Taylor ................ G06F 17/2288

OTHER PUBLICATIONS

Walmsley, Add structure and semantics to content with XSLT 2.0, Transform unstructured narrative content to structured, feature-rich XML, developerWorks, IBM Corporation, 2011, pp. 1-14.
Nicki L. Davis et al, Surviving the Transition to DITA: Trusted Partners can Ease the Pain, slideshare.net, 2015, entire document.
Wikipedia, The Free Encyclopedia, Darwin Information Typing Architecture, IBM Endicott, 2017, pp. 1-7.
Quirk Enterprise Solutions, IBM Microelectronics Innovates with a DITA-based Information Strategy, https://www.youtube.com/watch?v=2C4gPnRkLCM, 2011, entire document.

* cited by examiner

Table 1: Gerund Momentum Weightage matrix

| S.no | Verb:Noun ratio | Weightage |
|---|---|---|
| 1. | 2 : 1 | High (70) |
| 2. | 1 : 2 | Low (20) |
| 3. | 1 : 1 | Average (40) |
| 4. | >2:1 | High (70) |

Table 2: Steps/Procedure Weightage matrix

| Sl. No | Procedure steps? | Weightage |
|---|---|---|
| 1. | Yes | High (30) |
| 2. | No | Low (0) |

FIG. 8

Table 3: Image Weightage matrix (Architecture diagram vs. screenshot)

| Sl. No | Architecture diagram? | Weightage |
|---|---|---|
| 1. | Yes | Low (0) |
| 2. | No | High (30) |

FIG. 9

Table 4: Sample scenarios

| Sl.no | Scenario | Gerund Momentum | Procedural steps | Image (Architecture?) | Identified Schema (GMC) |
|---|---|---|---|---|---|
| 1. | Verb > Noun<br>Steps: Nil<br>Image: Nil | HIGH (70)<br>(GM: 2:1 ratio) | LOW (0) | LOW (0) | Task (70) |
| 2. | Verb = Noun<br>Steps: Nil<br>Image: Nil | AVERAGE (40)<br>(GM: 1:1 ratio) | LOW (0) | LOW (0) | Inconclusive (40) |
| 3. | Verb = Noun<br>Steps: Yes<br>Image: Nil | AVERAGE (40)<br>(GM: 1:1 ratio) | HIGH (30) | LOW (0) | TASK (70) |
| 4. | Verb = Noun<br>Steps: Nil<br>Image: Yes (screenshot) | AVERAGE (40)<br>(GM: 1:1 ratio) | LOW (0) | HIGH (30) | TASK (70) |
| 5. | Verb < Noun<br>Steps: Nil<br>Image: Nil | LOW (20)<br>(GM: 1:2 ratio) | LOW (0) | LOW (0) | CONCEPT (20) |
| 6. | Verb < Noun<br>Steps: Yes<br>Image: Nil | LOW (20)<br>(GM: 1:2 ratio) | HIGH (30) | LOW (0) | CONCEPT (50) |
| 7. | Verb < Noun<br>Steps: Yes<br>Image: Yes (screenshot) | LOW (20)<br>(GM: 1:2 ratio) | HIGH (30) | HIGH (30) | TASK (80) |

FIG. 10

UNSTRUCTURED DOCUMENT MIGRATOR

BACKGROUND

An unstructured document migrator migrates an unstructured to a Darwin Information Typing Architecture (DITA). DITA is an industry content standard for creating and managing diverse types of documentation and is a write-one, publish-many technologies used for a variety of applications, including stand-alone documents, large online content collections, embedded user assistance, and customized run time generation of help systems.

DITA is not limited to a specific XML dialect, instead it provides an extensible model for topic-based content authoring and management. DITA permits the creation of custom content topic types called specialization, which are derived from the main Topic archetype based on schema inheritance mechanisms. Examples of child topic types derived from Topic include Concept, Task, and Reference. Additional topic types can be derived from these such as API topic type, message topic type, white paper topic type, and more. Strong topic typing ensures and enforces content consistency from writer to writer, enables reuse, and preserves investment in content. It also preserves investment in existing processing, which is also extensible. Based on XML, DITA provides semantically rich intelligent content that machines can process with predictability and exceptional flexibility.

DITA provides a framework to create, build and deliver complex technical information sets with flexible features that enable extensive reuse and re-purposing. DITA has resulted in a large growing commercial marketplace of DITA tools and services based on the open DITA standard. These tools and services reduce cost and complexity of DITA, and enable cross industry content interchange by DITA adopters whereas traditional solutions typically an expensive roll-you-own proposition.

A DITA documentation library is created by dividing information into collections of topics (and nested collections), which are then processed to create a variety of outputs. The three most common DITA topic types, differentiated by their schema, are task, concept, and reference. Each DITA topic file contains a title element, a short description element, elements to contain metadata, and a body element that comprises information regarding the specific topic. The metadata in DITA includes information and attributes about the topic which makes it easier to locate.

DITA is a broadly accepted industry standard that has a vibrant community with deep skills and expertise in DITA implementation across various industries such as telecom, banking, insurance, medical instrumentation, software and even academics. DITA's content reuse and single sourcing capabilities were its strengths that were leveraged by enterprises and organizations large and small.

Compared to What You See Is What You Get (WYSIWYG) publishing, DITA is complex. The complexity of DITA, both real and perceived, is an inhibitor to adoption. Despite its complexity, enterprises choose to standardize on DITA to manage complex publishing demands that often include multi-channel and multi-format (omni-channel) publishing, distributed authoring, extensive reuse, and in-line version control. However, enterprises with limited budgets and tight deadlines must often migrate large volumes of legacy content to DITA from various applications, such as word processing, desktop publishing, and legacy SGML formats. Conversion scripts are typically employed to convert to DITA. These scripts cannot automatically determine the source and target topic type unless additional metadata is manually added to the source content. Adding additional metadata is often a prohibitively time consuming, manual process. Typical approaches often involve the manual assignment of named paragraph styles or markers for unstructured word processing source files, the manual addition of metadata in structured source files, or the insertion of eye-catcher text. All of these methods are labor and time intensive. For unstructured content, the challenge is further compounded by the fact that the source typically identifies only how the content looks, not what it is.

As a result, attempts to use heuristic methods results in poor partial conversion with excessive post-conversion manual conversion required. As a result of these limitations, organizations often choose to convert their content to the generic DITA topic type, or convert everything to only one specialized topic type. These approaches require less complex conversion scripts. However, the resulting absence of strong and accurate topic typing defeats one of the main benefits of DITA. Post-conversion retro-fitting from one topic type to another is often costly and complex due to the constraints between topics, thus post-conversion topic typing is rarely undertaken, despite best intentions.

SUMMARY

In one aspect of the present invention, a computerized method for migrating an unstructured document to a specific document type definition Darwin Information Typing architecture includes executing steps on a computer processor. Thus, a computer processor is configured to calculate a verb to noun ratio of an unstructured document by dividing a plurality of verbs of the unstructured document by a plurality of nouns of the unstructured document, assign a first weight to the unstructured document based on the calculated verb to noun ratio, and migrate the unstructured document to a specific document type definition Darwin Information Typing Architecture based on the first weight.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to calculate a verb to noun ratio of an unstructured document by dividing a plurality of verbs of the unstructured document by a plurality of nouns of the unstructured document, assign a first weight to the unstructured document based on the calculated verb to noun ratio, and migrate the unstructured document to a specific document type definition Darwin Information Typing Architecture based on the first weight.

In another aspect, a computer program product for migrating an unstructured document to a specific document type definition Darwin Information Typing architecture includes executing steps on a computer processor that has a computer-readable storage medium with computer readable program code embodied therewith. The computer readable hardware medium is not a transitory signal per se. The computer readable program code includes instructions for execution which cause the processor to calculate a verb to noun ratio of an unstructured document by dividing a plurality verbs of the unstructured document by a plurality of nouns of the unstructured document, assign a first weight to the unstructured document based on the calculated verb to noun ratio, and migrate the unstructured document to a specific document type definition Darwin Information Typing Architecture based on the first weight.

BRIEF DESCRIPTION OF THE DRAWINGS

These and other features of embodiments of the present invention will be more readily understood from the following detailed description of the various aspects of the invention taken in conjunction with the accompanying drawings in which:

FIG. 8 a tabular graphic of an embodiment of the present invention.

FIG. 9 a tabular graphic of an embodiment of the present invention.

FIG. 10 a tabular graphic of an embodiment of the present invention.

DETAILED DESCRIPTION

Figure 1:
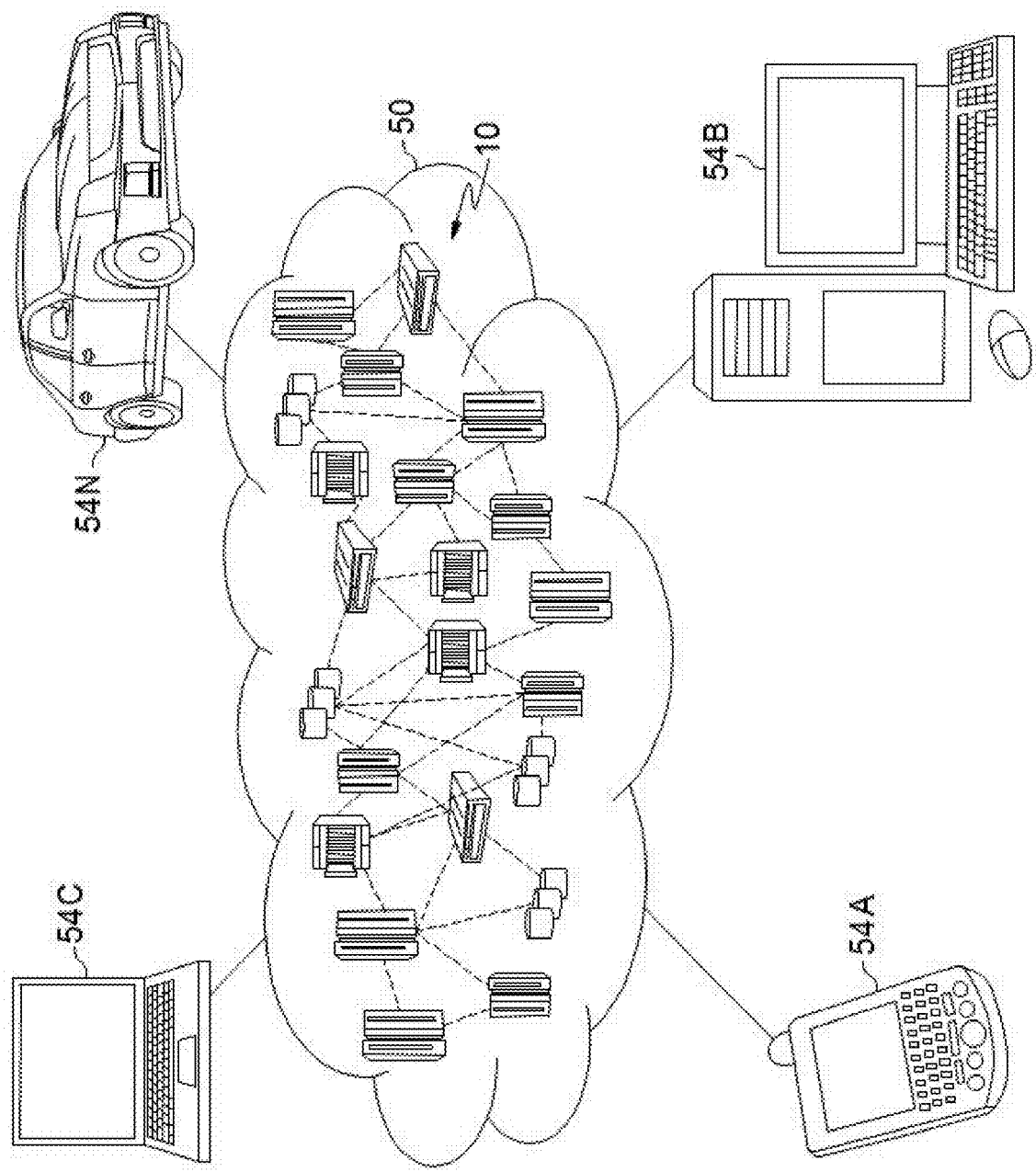
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
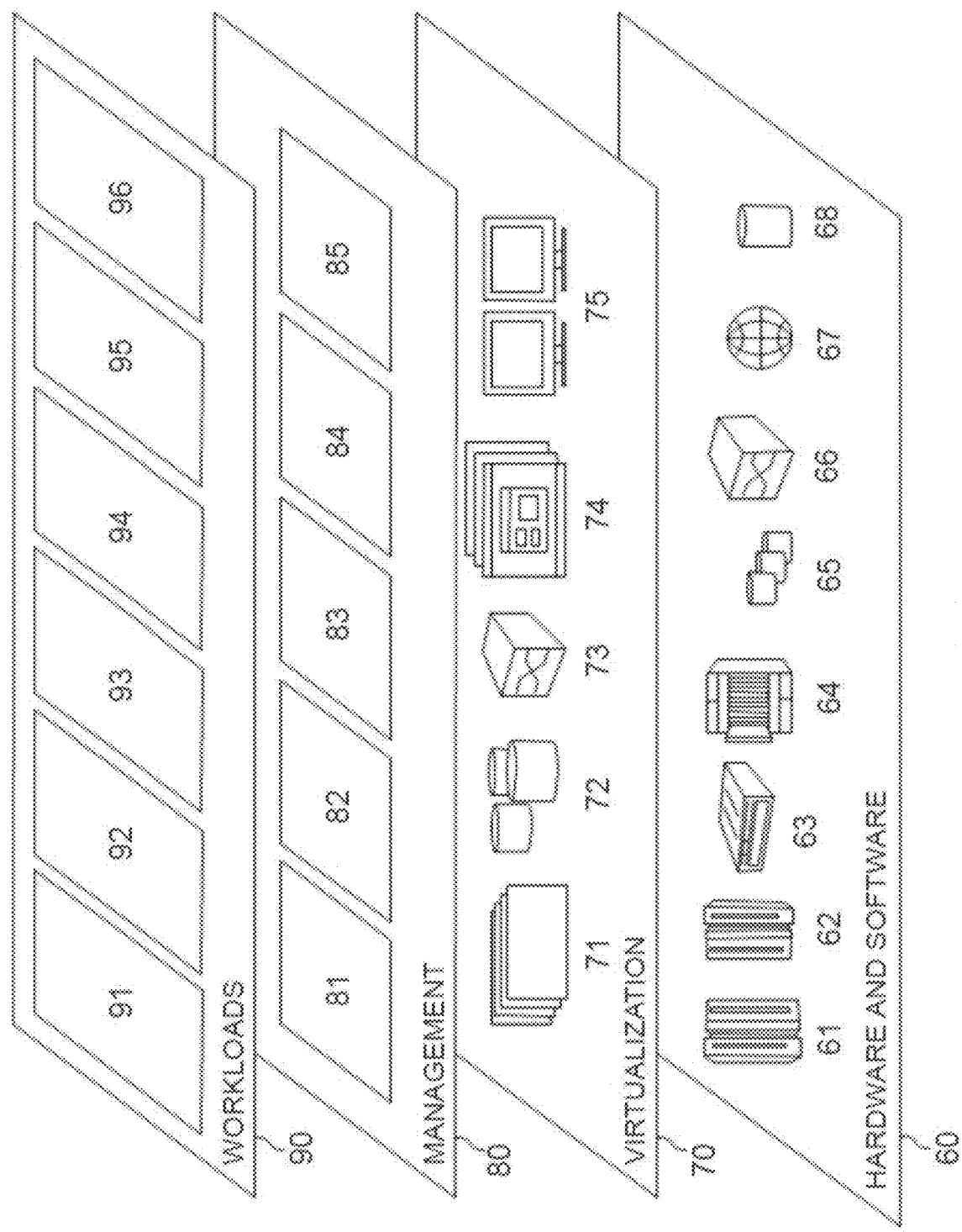
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing migrating an unstructured document to a specific document type definition Darwin Information Typing architecture 96.

Figure 3:
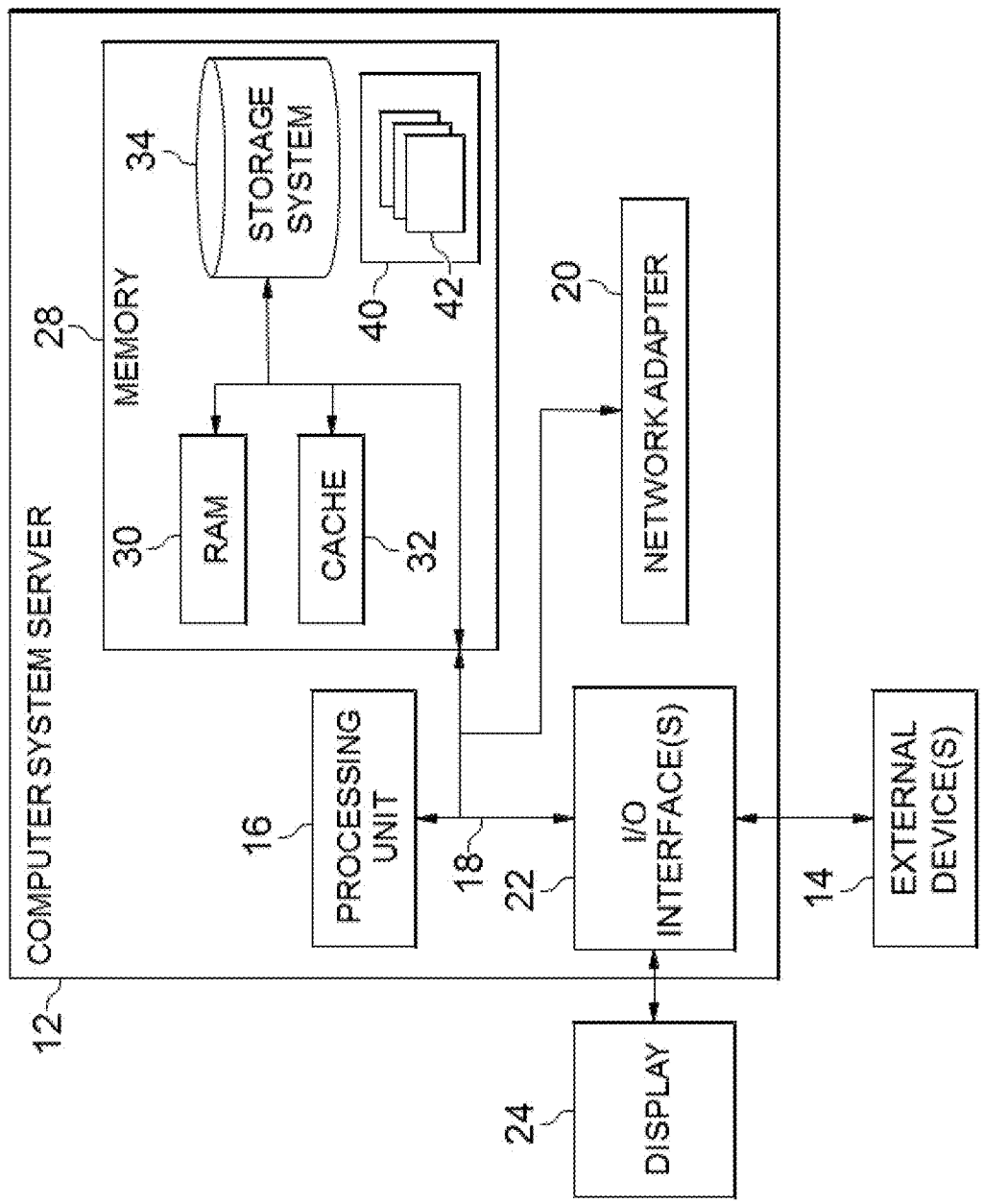
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
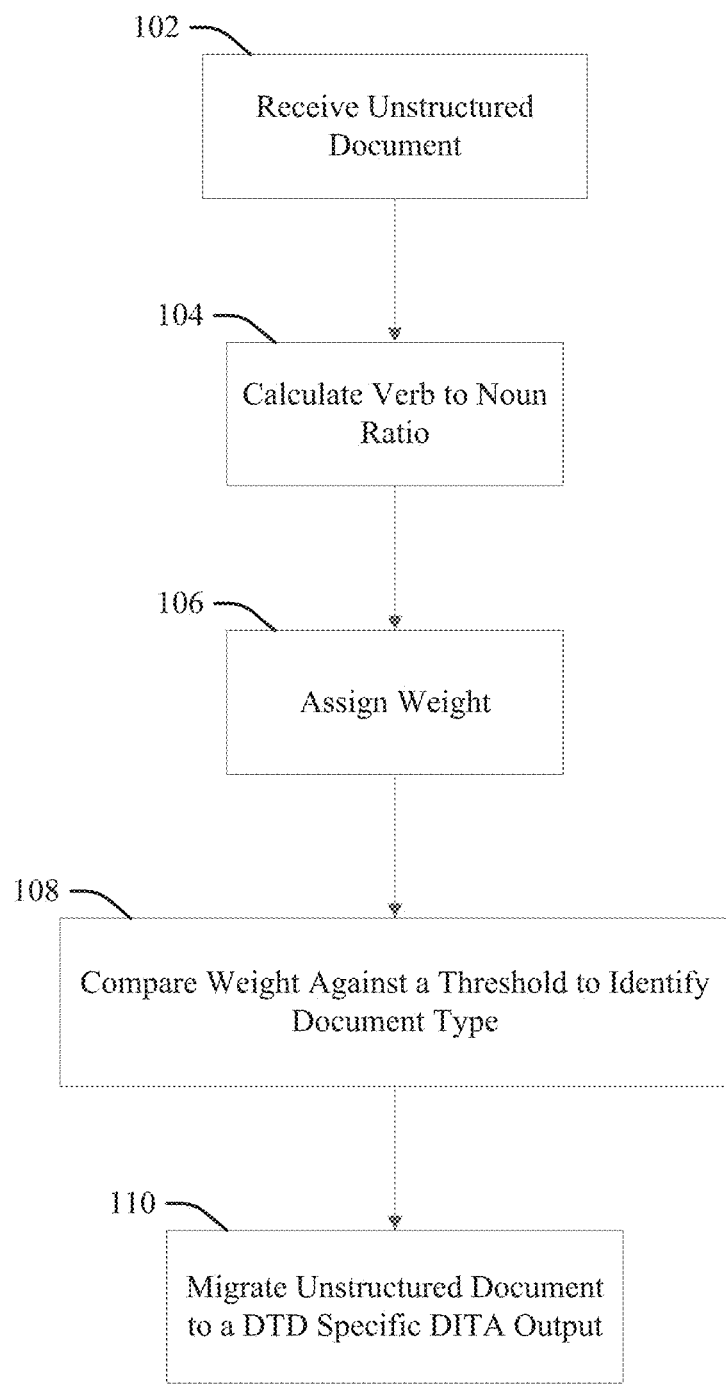
FIG. 4 is a flow chart illustration of an embodiment of the present invention.

FIG. 4 illustrates a process or system according to the present invention for migrating a non-DITA source document to a DITA output. At 102, a processor that is configured according to an aspect of the present invention (the "configured processor") receives an unstructured document. The unstructured document may be in any non-DITA word processing source format (illustrative but not limiting or exhaustive examples include Plain Text Format, Rich Text Format, Unicode Text Format).

At 104, the configured processor calculates a verb to noun ratio of the unstructured document by dividing a plurality of verbs of the unstructured document by a plurality of nouns of the unstructured document. In one example, if the plurality of verbs of the unstructured document is 10 and the plurality of nouns of the unstructured document is 5, then the calculated verb to noun ratio is 2:1. In another example, if the plurality of verbs of the unstructured document is 10 and the plurality of nouns of the unstructured document is 10, then the calculated verb to noun ratio is 1:1. In yet another example, if the plurality of verbs of the unstructured document is 5 and the plurality of nouns of the unstructured document is 10, then the calculated verb to noun ratio is 1:2.

At 106, the configured processor assigns a weight to the unstructured document based on the calculated verb to noun ratio. In one example, if the verb to noun ratio is 2:1, then the verb to noun ratio may be assigned a weight of 70. In another example, if the verb to noun ratio is 1:2, then the verb to noun ratio may be assigned a weight of 20. In yet another example, if the verb to noun ratio is 1:1, then the verb to noun ratio may be assigned a weight of 40.

At 108, the configured processor compares the weight against a threshold to identify a document type. In one example, if the threshold is 50 and the weight is greater than or equal to 50, then the unstructured document is identified as a task file. In another example, if the threshold is 50 and weight is less than 50, then the unstructured document is identified as a concept file.

At 110, the configured processor migrates the unstructured document to a document type definition (DTD) specific DITA output based on the identified unstructured document type. In one example, if the unstructured document is identified as a task file then, the unstructured document is migrated to a task DTD specific DITA output. In another example, if the unstructured document is identified as a concept file then, the unstructured document is migrated to a concept DTD specific DITA output.

Figure 5:
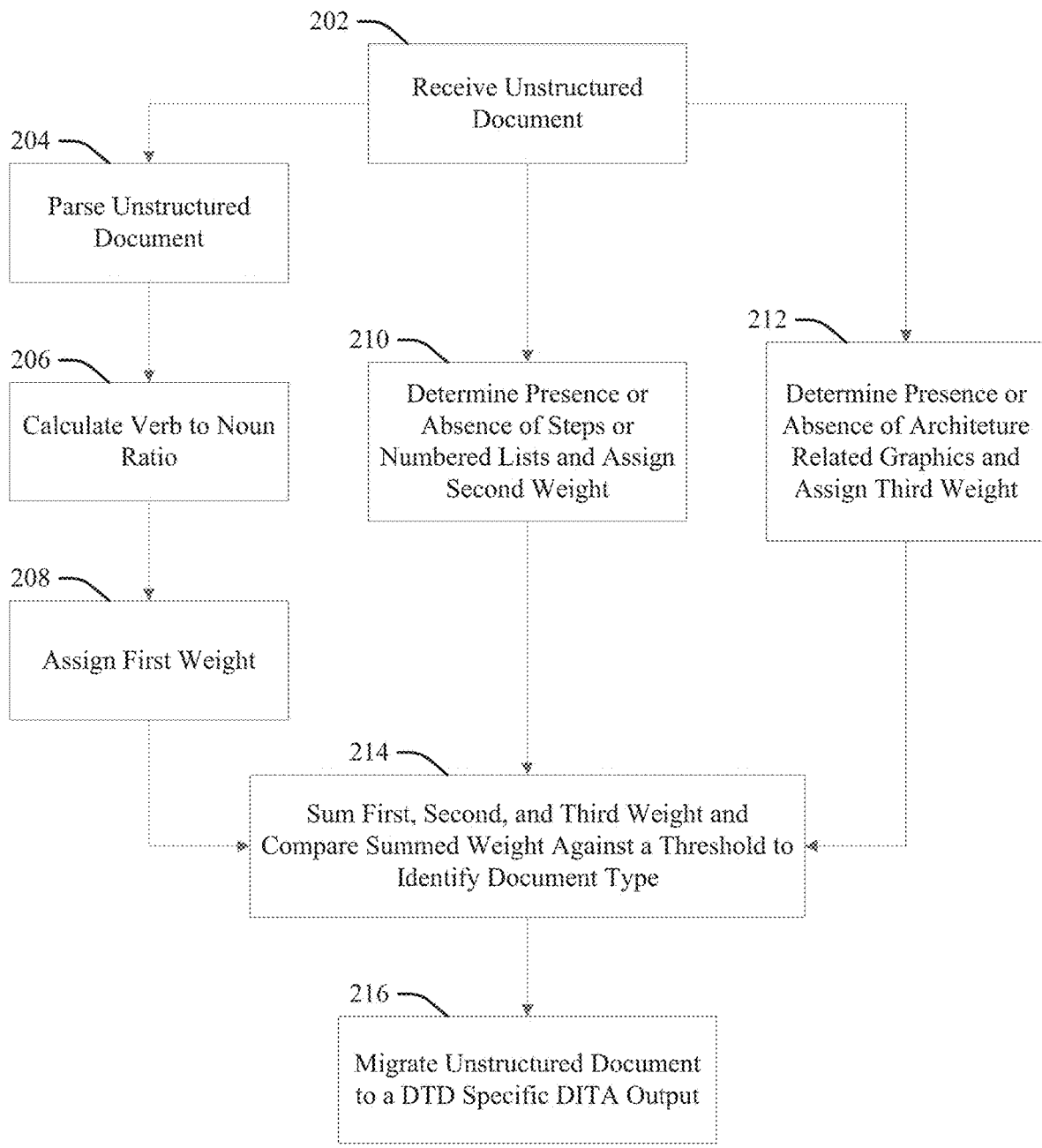
FIG. 5 is a flow chart illustration of an embodiment of the present invention.

FIG. 5 illustrates a process or system according to the present invention for migrating a non-DITA source document to a DITA output. At 202, a processor that is configured according to an aspect of the present invention (the "configured processor") receives an unstructured document. The unstructured document may be in any non-DITA word processing source format (illustrative but not limiting or exhaustive examples include Plain Text Format, Rich Text Format, Unicode Text Format).

A defining factor, and an essential characteristic of good product documentation, is the ability to narrow down content to the bare minimum needed to help the user complete a task in the bare minimum time. This is usually accomplished using best practices, such as having a well-defined enterprise or domain style guide, ensuring consistency and editorial accuracy using computational linguistic tools, and also by subjecting the technical content through a technical and mechanical editorial review cycle. With a good product documentation work that is task-oriented, the following syllogism applies: Tasks=rich in steps. Thus tasks would be rich in verbs+numbered lists. That is, task topics would be rich in verbs.

Aspects further include a gerund momentum compendium device that at 204, parses a plurality of sentences of the unstructured document by matching a plurality of verbs of the plurality of sentences to a verb in a "verb taxonomy list" and by matching a plurality of nouns of the plurality of sentences to a noun in a "noun taxonomy list" thereby generating a matched verbs set and a matched nouns set.

For example, if the unstructured document contains the sentence "I threw the ball" and the verb taxonomy list contains the sentence threw and the noun taxonomy list contains the word ball, then the gerund momentum compendium device matches the words threw and ball to the verb and noun taxonomy lists respectively.

At 206, the gerund momentum compendium device determines gerund momentum by calculating a verb to noun ratio. The verb to noun ratio is calculated by dividing a number verbs in the matched verbs set by a number of nouns in the matched nouns set. In one example, if there are 10 matched verbs and 5 matched nouns, then the gerund momentum compendium device calculates the verb to noun ratio as 2:1. In another example, if there are 5 matched verbs and 5 matched nouns, then the gerund momentum compendium device calculates the verb to noun ratio as 1:1. In yet another example, if there are 5 matched verbs and 10 matched nouns then the gerund momentum compendium device calculates the verb to noun ratio as 1:2.

Figures 6, 7:
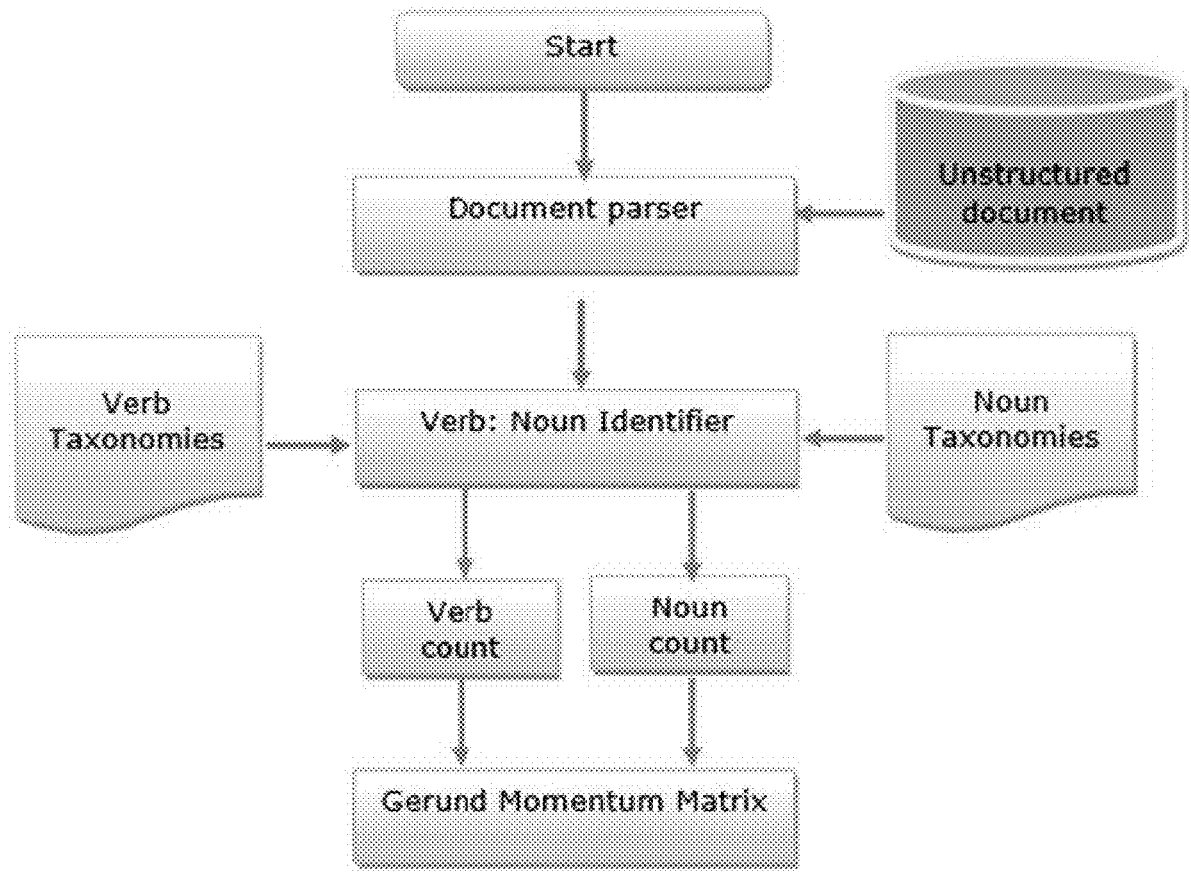
FIG. 6 is a flow chart illustration of an embodiment of the present invention.
FIG. 7 is a tabular graphic of an embodiment of the present invention.

Briefly turning to FIG. 6, FIG. 6 provides an example of determining a gerund momentum.

Returning to FIG. 5, at 208, the gerund momentum compendium device assigns a first weight to the unstructured document based on the verb to noun ratio. In one instance the greater the verb to noun ratio, the greater the weight. In one example, if the verb to noun ratio is 2:1, then the unstructured document may be assigned a first weight of 70. In another example, if the verb to noun ratio is 1:2, then the unstructured document may be assigned a first weight of 20. In yet another example, if the verb to noun ratio is 1:1, then the unstructured document ratio may be assigned a first weight of 40.

Briefly turning to FIG. 7, FIG. 7 provides an example table of differing first weights based on the calculated verb to noun ratio.

Returning to FIG. 5, aspects further include a sequential procedure device that, at 210, the sequential procedure device determines a presence or an absence of steps or numbered lists that denote steps within the unstructured document and assigns a second weight to the unstructured document based on presence or absence of the number of steps or numbered lists. In one example, if sequential procedure device determines that there are steps or numbered lists within the unstructured document, then the second weight may be 30. In another example, if the sequential procedure device determines that steps or numbered lists are absent within the unstructured document, then the second weight may be 0.

Briefly turning to FIG. 8, FIG. 8 provides an example table of differing second weights based on the presence or absence of steps or numbered lists that denote steps within the unstructured document.

Returning to FIG. 5, aspects further include an image analyzer device that, at 212, determines a presence or an absence of architecture related graphics (illustrative but not limiting or exhaustive examples include artwork, block diagrams, and architecture diagrams) by applying a cognitive system to the unstructured document and assigns a third weight to the unstructured document based on the presence or absence of architecture related graphics. In one example, if the image analyzer device determines that there are architecture related graphics within the unstructured document, then the third weight may be 0. In another example, if the image analyzer device determines that architecture related graphics are absent within the unstructured document, then the second weight may be 30.

Briefly turning to FIG. 9, FIG. 9 provides an example table of differing third weights based on the presence or absence of architecture related graphics within the unstructured document.

Returning to FIG. 5, at t 214, the configured processor sums the first, second, and third weights and compares the sum to a threshold to identify the unstructured document type. In one example, if the threshold is 50 and the sum of the first, second, and third weights is greater than 50, then the unstructured document is identified as a task file. In another example, if the threshold is 50 and the sum of the first, second, and third weights is less than 50, then the unstructured document is identified as a concept file. In yet another example if the threshold is 50 and the sum of the first, second, and third weights is 50, then the unstructured document is identified as an inconclusive file.

Briefly turning to FIG. 10, FIG. 10 provides an example table of summing the first, second and third to identify the unstructured document type.

Returning to FIG. 5, at 216, the configured processor migrates the unstructured document to a document type definition (DTD) specific DITA output based on the identified unstructured document type. In one example, if the unstructured document is identified as a task file then, the unstructured document is migrated to a task DTD specific DITA output. In another example, if the unstructured document is identified as a concept file then, the unstructured document is migrated to a concept DTD specific DITA output.

Figure 11:
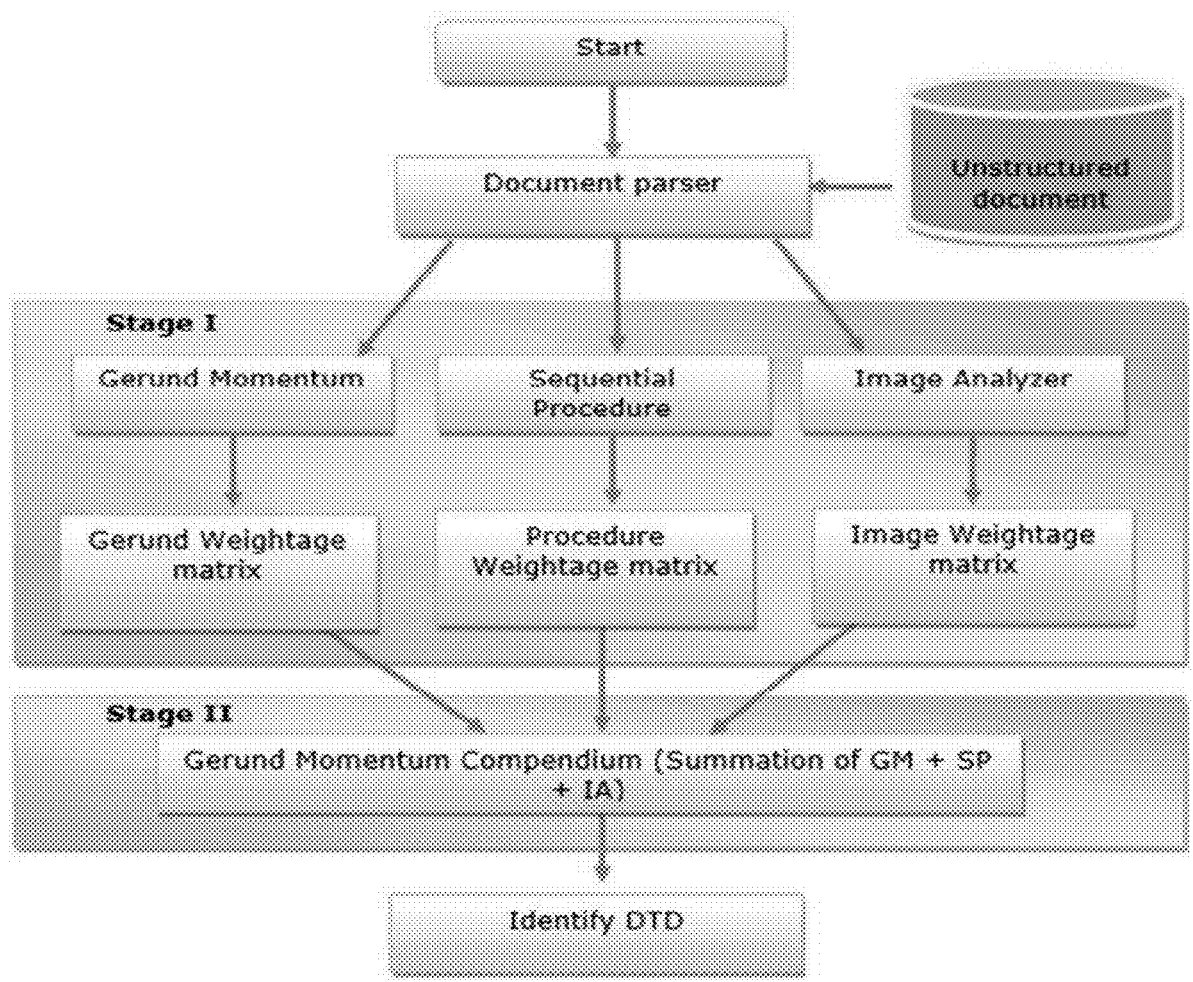
FIG. 11 is a flow chart illustration of an embodiment of the present invention.

FIG. 11 further illustrates a method of identifying a specific DTD.

The described method of the Gerund momentum principle provides a strong indicator of which topic type is a best match for conversion to DITA, or, conversion from one topic type to another. The degree of precision of the right topic type for a given content entity can be increased further through the application of computational linguistic analytics. For example, using a computational linguistic engines normalize language and assign weight to each noun, noun-string, or verb based on where each occurs, and, using frequency, density, part of speech proximity, and contextual weighting, generate prominence scores for each noun or verb. Combining the Gerund momentum principle with computational linguistics substantially increases the confidence level and improves the precision of topic classification.

Taking the classification process a step further involves the application of a cognitive engine, training the engine with data about linguistic relationships using paired taxonomies, and ontologies. Such a classification engine exists to suggest such things as the most applicable industry classification to a body of content.

Content conversion provides a strong value proposition for the automated identification of source and target topic typing. Using Gerund momentum principle, source content can assist in the classification of content for the purpose of conversion. However, it can also be applied during authoring. A new generation of guided and fluid structured authoring tools is emerging. Fluid authoring provides the ability to write highly semantic structured content in constrained topic types in a natural way, unencumbered by XML tagging, the use of forms, or templates. Guided authoring provides visual cues that assist the writer and automatically ensure that required and optional semantic structures are properly added without burdening the writer with the need to know DITA tagging or concepts. Methods such as the Gerund momentum principle can be applied when authoring new content, allowing the writer to write freely, and, when combined with guided authoring methods such as those found in commercial authoring tools can enable free-form authoring, dynamically suggest which topic type should be applied while content is being written, and use the underlying conversion mechanism in the editor to apply the correct semantic structure that conforms to the specific topic type.

Thus, aspects of the present invention use analytics to properly identify the document type of an unstructured document. As a result, documents are accurately typed in a time efficient manner.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor:
   determining a verb to noun ratio value for of an unstructured document by dividing a number of verbs identified within text content of the unstructured document by a number of nouns identified within the text content of the unstructured document, wherein the unstructured document is in a non-Darwin Information Typing architecture word processing format;
   assigning a first weight value to the unstructured document based on the calculated verb to noun ratio value;
   selecting one of a plurality of different definition-specific Darwin Information Typing Architecture document type output formats as a function of the assigned first weight value; and
   migrating the unstructured document from the non-Darwin Information Typing architecture word processing source format to the selected definition-specific Darwin Information Typing Architecture document type output format.

2. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the determining the verb to noun ratio value of the unstructured document the assigning the first weight value to the unstructured document based on the calculated verb to noun ratio value, the selecting the one of the plurality of different definition-specific Darwin Information Typing Architecture document type output formats as the function of the assigned first weight value, and the migrating the unstructured document to the selected definition-specific Darwin Information Typing Architecture document type output format.

3. The method of claim 1, wherein the computer-readable program code is provided as a service in a cloud environment.

4. The method of claim 1, further comprising:
   generating a matched verbs set by matching a plurality of the verbs identified within the unstructured document text content to verbs within a verb taxonomy list;
   generating a matched nouns set by matching a plurality of the nouns identified within the unstructured document text content to nouns within a noun taxonomy list; and
   determining the verb to noun ratio value by dividing a number of the verbs in the matched verbs set by a number of the nouns in the matched noun set.

5. The method of claim 1, further comprising:
   determining one of a presence and an absence of numbered lists or steps within the unstructured document;
   assigning a second weight value to the unstructured document based on the determined one of the presence or the absence of the numbered lists or steps within the unstructured document;
   determining one of a presence and an absence of architecture related graphics within the unstructured document by applying a cognitive system to the unstructured document;
   assigning a third weight value to the unstructured document based on the determined one of the presence or the absence of the architecture related graphics within the unstructured document;
   summing the first weight value, the second weight value, and the third weight value;
   identifying a file type of the unstructured document as a function of comparing the sum of the first weight value, the second weight value; and the third weight value to a summation threshold; and
   migrating the unstructured document text content to the selected definition-specific Darwin Information Typing Architecture document type output format as a function of the identified unstructured document file type.

6. The method of claim 1, further comprising:
   comparing the first weight to a first threshold to identify a file type of the unstructured document; and
   migrating the unstructured document to the selected definition specific Darwin Information Typing Architecture document type output format that matches the identified unstructured document file type.

7. The method of claim 6, further comprising:
   in response to determining that the verb to noun ratio value is 2:1 or greater, assigning the first weight value to a value exceeding the first threshold;
   in response to determining that the first weight value exceeds the first threshold, identifying the unstructured document file type as a task file type; and
   in response to identifying the unstructured document file type as the task file type, selecting a task document type output format for the migrating of the unstructured document.

8. The method of claim 7, further comprising:
   in response to determining that the verb to noun ratio value is less than 2:1, assigning the first weight value to another value that does not exceed the first threshold;
   in response to determining that the assigned first weight value does not exceed the first threshold, identifying the unstructured document file type as a concept file type; and in response to identifying the unstructured document file type as the concept file type, selecting a concept document type output format for the migrating of the unstructured document.

9. A system comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
determines a verb to noun ratio value for an unstructured document by dividing a number of verbs identified within text content of the unstructured document by a number of nouns identified within the text content of the unstructured document, wherein the unstructured document is in a non-Darwin Information Typing architecture word processing format;
assigns a first weight value to the unstructured document based on the calculated verb to noun ratio value;
selects one of a plurality of different definition-specific Darwin Information Typing Architecture document type output formats as a function of the assigned first weight value; and
migrates the unstructured document from the non-Darwin Information Typing architecture word processing source format to the selected definition-specific Darwin Information Typing Architecture document type output format.

10. The system of claim 9, wherein the processor executes the program instructions stored on the computer-readable storage medium via the computer readable memory and thereby:
generates a matched verbs set by matching a plurality of the verbs identified within the unstructured document to verbs within a verb taxonomy list;
generates a matched nouns set by matching a plurality of the nouns identified within the unstructured document to nouns within a noun taxonomy list; and
determines the verb to noun ratio value by dividing a number of the verbs in the matched verbs set by a number of the nouns in the matched noun set.

11. The system of claim 9, wherein the processor executes the program instructions stored on the computer-readable storage medium via the computer readable memory and thereby:
determines one of a presence and an absence of numbered lists or steps within the unstructured document;
assigns a second weight value to the unstructured document based on the determined one of the presence or the absence of the numbered lists or steps within the unstructured document;
determines one of a presence and an absence of architecture related graphics within the unstructured document by applying a cognitive system to the unstructured document;
assigns a third weight value to the unstructured document based on the determined one of the presence or the absence of the architecture related graphics within the unstructured document;
sums the first weight value, the second weight value, and the third weight value;
identifies a file type of the unstructured document as a function of comparing the sum of the first weight value, the second weight value and the third weight value to a summation threshold; and
migrates the unstructured document text content to the selected definition-specific Darwin Information Typing Architecture document type output format as a function of the identified unstructured document file type.

12. The system of claim 9, wherein the processor executes the program instructions stored on the computer-readable storage medium via the computer readable memory and thereby:
compares the first weight value to a first threshold to identify a file type of the unstructured document; and
migrates the unstructured document to the selected definition specific Darwin Information Typing Architecture document type output format that matches the identified unstructured document file type.

13. The system of claim 12, wherein the processor executes the program instructions stored on the computer-readable storage medium via the computer readable memory and thereby:
in response to determining that the verb to noun ratio value is 2:1 or greater, assigns the first weight value to a value that exceeds the first threshold;
in response to determining that the first weight value exceeds the first threshold, identifies the unstructured document file type as a task file type; and
in response to identifying the unstructured document file type as the task file type, selects a task document type output format for the migration of the unstructured document.

14. The system of claim 13, wherein the processor executes the program instructions stored on the computer-readable storage medium via the computer readable memory and thereby:
in response to determining that the verb to noun ratio value is less than 2:1, assigns the first weight value to another value that does not exceed the first threshold;
in response to determining that the assigned first weight value does not exceed the first threshold, identifies the unstructured document file type as a concept file type; and
in response to identifying the unstructured document file type as the concept file type, selects a concept document type output format for the migrating of the unstructured document.

15. A computer program product, comprising:
a computer readable storage medium having computer readable program code embodied therewith, the computer readable program code comprising instructions for execution by a processor that cause the processor to:
determine a verb to noun ratio of value for an unstructured document by dividing a number of verbs identified within text content of the unstructured document by a number of nouns identified within the text content of the unstructured document, wherein the unstructured document is in a non-Darwin Information Typing architecture word processing format;
assign a first weight value to the unstructured document based on the calculated verb to noun ratio value;
select one of a plurality of different definition-specific Darwin Information Typing Architecture document type output formats as a function of the assigned first weight value; and
migrate the unstructured document from the non-Darwin Information Typing architecture word processing source format to the selected definition-specific Darwin Information Typing Architecture document type output format.

16. The computer program product of claim 15, wherein the computer readable program code instructions for execution by the processor further cause the processor to:
   generate a matched verbs set by matching a plurality of the verbs identified within the unstructured document to verbs within a verb taxonomy list;
   generate a matched nouns set by matching a plurality of the nouns identified within the unstructured document to nouns within a noun taxonomy list; and
   determine the verb to noun ratio value by dividing a number of the verbs in the matched verbs set by a number of the nouns in the matched noun set.

17. The computer program product of claim 15, wherein the computer readable program code instructions for execution by the processor further cause the processor to:
   determine one of a presence and an absence of numbered lists or steps within the unstructured document;
   assign a second weight value to the unstructured document based on the determined one of the presence or the absence of the numbered lists or steps within the unstructured document;
   determine one of a presence and an absence of architecture related graphics within the unstructured document by applying a cognitive system to the unstructured document;
   assign a third weight value to the unstructured document based on the determined one of the presence or the absence of the architecture related graphics within the unstructured document;
   sum the first weight value, the second weight value, and the third weight value;
   identify a file type of the unstructured document as a function of comparing the sum of the first weight value, the second weight value and the third weight value to a summation threshold; and
   migrate the unstructured document text content to the selected definition-specific Darwin Information Typing Architecture document type output format as a function of the identified unstructured document file type.

18. The computer program product of claim 15, wherein the computer readable program code instructions for execution by the processor further cause the processor to:
   compare the first weight value to a first threshold to identify a file type of the unstructured document; and
   migrate the unstructured document to the selected document-specific Darwin Information Typing Architecture document type output format that matches the identified unstructured document file type.

19. The computer program product of claim 18, wherein the computer readable program code instructions for execution by the processor further cause the processor to:
   in response to determining that the verb to noun ratio value is 2:1 or greater, assign the first weight value to a value that exceeds the first threshold;
   in response to determining that the first weight value exceeds the first threshold, identify the unstructured document file type as a task file type; and
   in response to identifying the unstructured document file type as the task file type, selects a task document type output format for the migration of the unstructured document.

20. The computer program product of claim 19, wherein the computer readable program code instructions for execution by the processor further cause the processor to:
   in response to determining that the verb to noun ratio value is less than 2:1, assign the first weight value to another value that does not exceed the first threshold;
   in response to determining that the assigned first weight value does not exceed the first threshold, identify the unstructured document file type as a concept file type; and
   in response to identifying the unstructured document file type as the concept file type, select a concept document type output format for the migrating of the unstructured document.

* * * * *